United States Patent
Marx et al.

[11] Patent Number: 6,053,528
[45] Date of Patent: Apr. 25, 2000

[54] AIR-BAG MODULE

[75] Inventors: Roland Marx; Egon Schlett, both of Aschaffenburg, Germany

[73] Assignee: Petri AG, Aschaffenburg, Germany

[21] Appl. No.: 08/945,473

[22] PCT Filed: Apr. 9, 1996

[86] PCT No.: PCT/DE96/00682

§ 371 Date: Jan. 22, 1998

§ 102(e) Date: Jan. 22, 1998

[87] PCT Pub. No.: WO96/33888

PCT Pub. Date: Oct. 31, 1996

[30] Foreign Application Priority Data

Apr. 26, 1995 [DE] Germany .......................... 195 16 255

[51] Int. Cl.[7] .................................................. B60R 21/20
[52] U.S. Cl. ........................................ 280/728.3; 280/731
[58] Field of Search ............................ 280/728.3, 728.2, 280/731, 732

[56] References Cited

U.S. PATENT DOCUMENTS 5,261,693  11/1993  Krickl et al. .
5,263,739  11/1993  Webber et al. .
5,354,093  10/1994  Schenck et al. .
5,470,101  11/1995  Ennis ................................... 280/728.3
5,791,680   8/1998  Dyer .................................... 280/728.3

FOREIGN PATENT DOCUMENTS 9110293   11/1991  Germany .
4237923    5/1993  Germany .
4227559    2/1994  Germany .
WO93/08042  4/1993  WIPO .
WO94/25313 11/1994  WIPO .

Primary Examiner—Peter C. English
Attorney, Agent, or Firm—Christie, Parker & Hale, LLP

[57] ABSTRACT

An air bag module with a gas bag, at least one corresponding gas generator for inflating the gas bag, and a cover of the air bag module which is attached to a generator carrier in a simpler way. The cover includes bead-like profiles on resilient side walls which allow at least partial structural connection to the gas generator carrier by insertion into one side of corresponding grooves in the gas generator carrier. Profile strips with bead-like reinforcement are inserted into the other side of the grooves to lock the cover in place on the gas generator carrier.

12 Claims, 8 Drawing Sheets

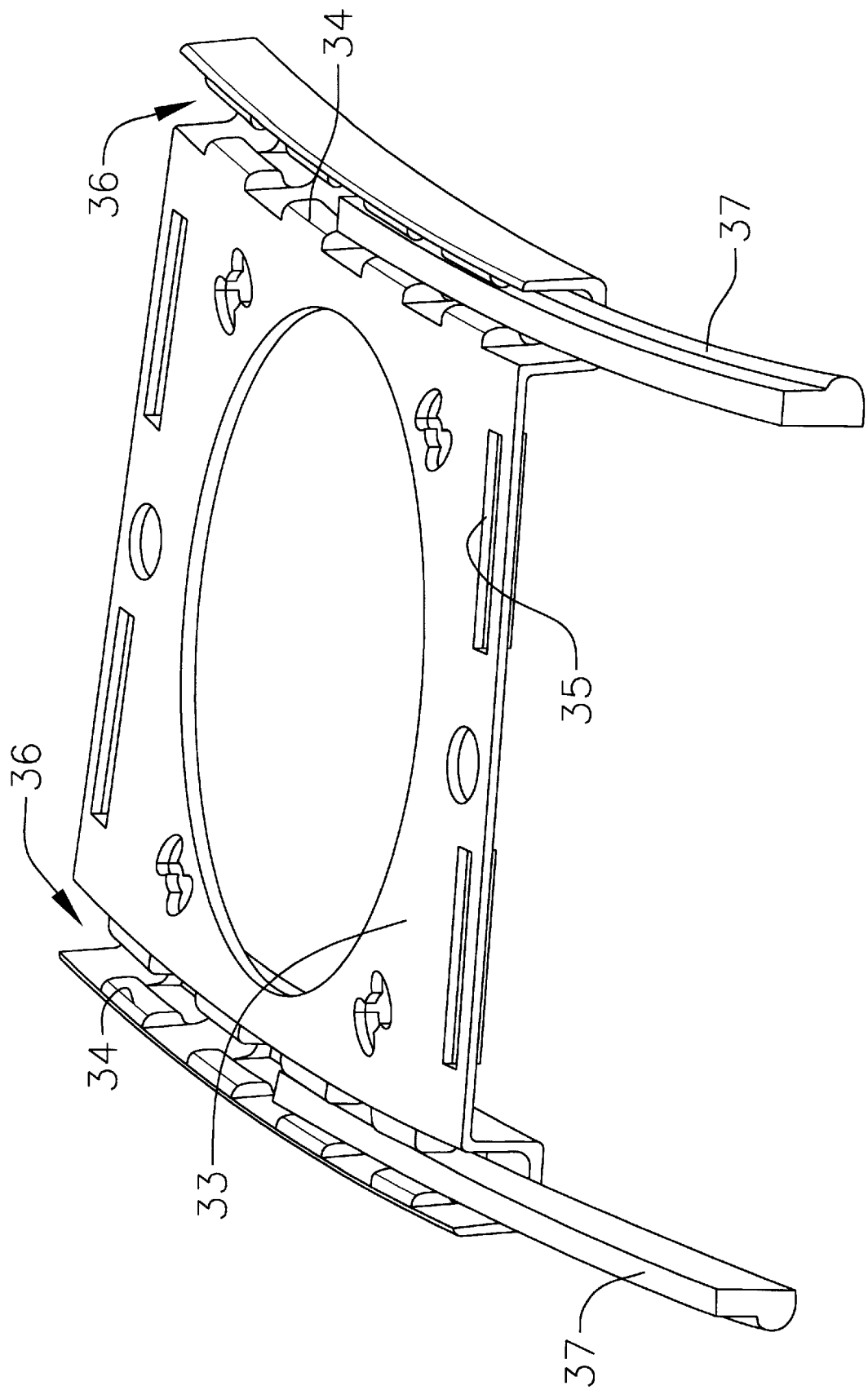

AIR-BAG MODULE

BACKGROUND

The invention relates to an air bag module.

It is known that air bag modules can be installed in a motor vehicle in order to protect the passengers from injury in the event of the motor vehicle being involved in an accident. This is achieved with the assistance of an inflatable pillow, or air bag, which is automatically inflated by a gas generator.

These air bag modules are provided with a cover in the motor vehicle. The air bag module is thereby protected from damage which can jeopardise the functioning of the air bag module. Also, the cover can be adapted to suit the aesthetic layout of the motor vehicle interior.

In the case of known air bag modules, this cover is attached by means of rivets to a carrier on which the gas generator and the gas bag are also positioned.

In the assembly of the known air bag modules, the gas generator and the gas bag are attached to a box-like carrier. On the base of the carrier, there are nuts or screws which allow the air bag module to be connected to the motor vehicle. The cover is secured to the side walls of the box-like carrier by means of rivets. The cover is made of plastic whereas the box-like carrier is made from aluminium or steel.

The known means of securing the cover has numerous disadvantages in its mechanical properties and its assembly. The plastic cover is secured by rivets at certain points which can give rise to rips and tears of the gas bag at the connection points in the event of continual use of the connection points. In order to prevent any individual rivet from being used excessively, a very large number of rivets must be attached to the cover around the side walls. The installation of the known cover on the carrier is therefore extremely labour-intensive and several production units are needed for the installation.

Furthermore, the known method of installation makes it considerably difficult to re-use the cover and the carrier because the rivet connection cannot be undone without costly intervention. When separating the materials, it is necessary to neatly separate the rivets, the cover and the carrier.

Published International Application WO 94/25313 discloses an air bag module with a gas generator and a gas bag, with an open housing for the gas generator and the gas bag on its end walls, as well as with a housing cover. This air bag module has on opposite-facing sides, profiled sections to which recesses in the housing correspond, and into which the profiled sections can be inserted from an end wall. After insertion, the housing on the end walls is locked by cover caps, whereby the ends of the profiled sections are also simultaneously fixed.

This air bag module has the disadvantage that the entire cap must be inserted into the case from an end wall of the case making assembly more difficult and requiring more free space on the side of the case.

U.S. Pat. No. 5,263,739 discloses an air bag module in which a gas bag is secured in an open-topped box-like housing by means of a profile rod. This housing is pushed from an end wall into profile grooves of a gas generator housing. This air bag module has the disadvantage that compact components groups must be brought into a housing from the end wall.

SUMMARY

According to various embodiments of the invention it is possible to provide an airbag which can be simply positioned at a designated location. Furthermore, the air bag module is easy to dismantle so that the materials can be re-used.

One embodiment of the invention is an air bag module including: a flat gas generator carrier having two or more grooves having, on opposite sides, a first and a second hollow profile; at least one gas generator connected to the flat gas generator carrier; a gas bag connected to the at least one gas generator; and a cover having, on at least two opposite sides, a resilient vertical plate with bead-like profiles each of which is adjacent one of the grooves. The bead-like profiles have a width less than a width of the adjacent groove, and correspond in shape to the first hollow profile of the adjacent groove. A plurality of profile strips, each adjacent one of the grooves and corresponding in shape to the second hollow profile of the corresponding one of the grooves, are provided and adapted to be inserted in the corresponding one of the grooves with a corresponding one of the bead-like profiles of the vertical plates, thereby providing a solid connection between the flat gas generator carrier and the cover.

Another embodiment of the air bag module includes at least one gas generator, one component carrying the gas generator, one gas bag and one air bag module cover, wherein the cover has a means of attachment which allows at least partial structural connection to the component carrying the gas generator. The cover has profiled sections to which recesses in the component carrying the gas generator correspond, and the profiled sections can be inserted and locked in these recesses. The cover comprises a cap which has, on at least two opposite-facing sides, resilient vertical plates with bead-like profiles to which grooves in a flat gas generator carrier correspond. The grooves have on one side a hollow profile adapted to the cross-section of the bead-like profiles and are wider than the respective vertical plate. For the purpose of locking the vertical plates to the component carrying the gas generator there are profile strips which can be inserted into the grooves which have a hollow profile corresponding to bead-like reinforcement on the profiles on the profile strips. Such a cap can easily be attached to the component carrying the gas generator(s) and then easily be removed.

The vertical plates are preferably provided in the form of side walls of the cap.

The component that carries the gas generator preferably takes the form of a flat-shaped gas generator carrier with two U-shaped profile grooves on opposite-facing narrow sides. Furthermore, the cap has two resilient vertical plates which grip the profile grooves, whereby the U-shaped profiles have bead-like reinforcements located at certain points and corresponding to bead-like reinforcements on the vertical plates which grip under these bead-like reinforcements.

In another embodiment, the profile strips have on one side continuous bead-like reinforcements which can be inserted length-wise into the profile grooves and to which bead-like reinforcements in the profile grooves correspond.

In this embodiment, two opposite-facing vertical plates of the cap are inserted into the profile grooves. Due to the resilient nature of the vertical plates, the bead-like reinforcements of the vertical plates grip behind the bead-like reinforcements of the profile grooves like a spring lock. In order to secure the spring connection, the profile strips are then inserted length-wise into the profile grooves.

In a further embodiment, the grooves or U-shaped profiles have perforations in their base in the region of the bead-like reinforcements that are located at certain points. In the perforation gap, profile elements are provided which can be inserted into the profile grooves through the perforations at right angles to the run of the groove. These profile elements ensure a solid connection between the cap and the gas generator carrier.

In another embodiment, the profile elements in the perforation gap are provided on security strips. The profile elements can be inserted into the profile grooves through the perforations at right angles to the profile grooves. Together with the security strips, the profile elements can be moved along the profile grooves into a fully inserted position. In order to thus move them along, each profile element is connected at one end of its base to the security strip. From this connection point the profile elements are spaced apart from the security strip forming a gap, whereby the gap corresponds to at least the thickness of the base of the profile grooves. As the profile elements are moved along, a solid connection between the gas generator carrier and the cap in the profile groove of the gas generator carrier is ensured.

In another embodiment, the gas generator carrier has on all its narrow sides profile grooves with perforations in the base of the profile grooves. Profile elements on a ring can be inserted through the perforations into the profile grooves.

In a further embodiment, the cap can be locked on two opposite-facing sides to the gas generator carrier by means of profile strips. On two sides running perpendicularly to these sides, the cap is connected to the gas generator carrier by means of plug fastenings.

In yet another embodiment, the attachments are formed in such a way that there are spring units with lips provided on the cap. Slots with plastically deformable vertical plates on the gas generator carrier correspond to these spring units with lips whereby the lips are wider than the slots when the vertical plates have not been specifically shaped for a locking geometry.

An air bag module according to this embodiment of the invention has the advantage that its cover is both easy to assemble and easy to dismantle. This allows production costs to be saved and it also makes it easier to re-use the air bag material when it is separated.

According to a further embodiment of the invention, the profile grooves of the gas generator carrier have in at least one dimension a contour which deviates from the straight line. This prevents the profile strips from slipping from the profile grooves to a greater extent.

The gas generator carrier is preferably a pressure cast or an injected molded component.

BRIEF DESCRIPTION OF THE DRAWINGS

The invention will now be discussed with reference to the various embodiments shown in the following drawings.

FIG. 8 is a perspective view of a carrier according to a further embodiment of the gas bag module according to the invention.

DETAILED DESCRIPTION

Figure 1:
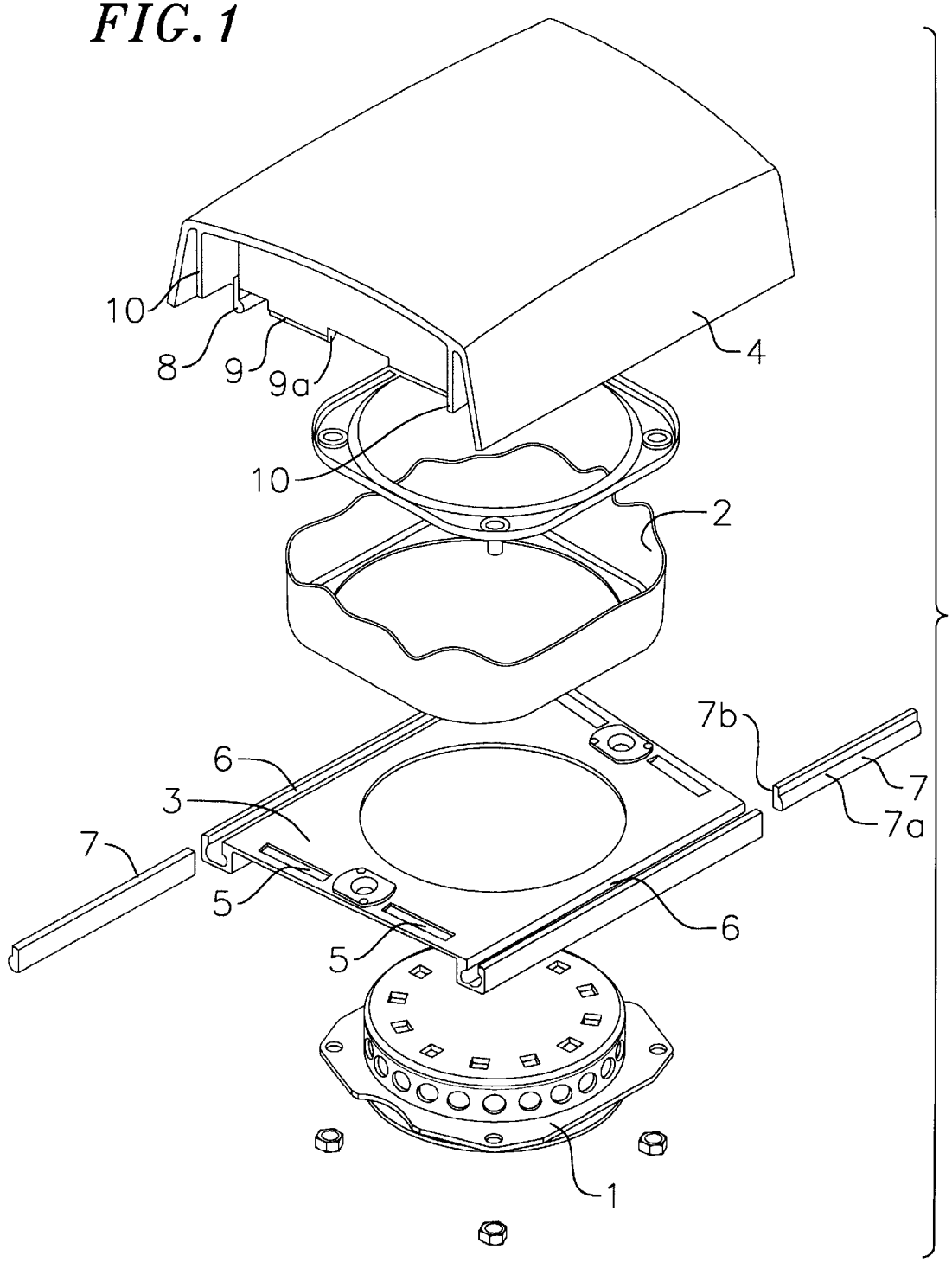
FIG. 1 is a schematic, exploded view of one embodiment of the air bag module according to the invention that includes a gas generator carrier.

The air bag module illustrated in FIG. 1 has a gas generator 1 and a broken-away partially shown gas bag 2 which are both associated with a gas generator carrier 3. Gas generator carrier 3 has a profile groove 6 on two opposite-facing sides. On each of the two opposite-facing sides that lie at right angles to the sides with the profile grooves 6, the gas generator carrier 3 has two slots 5. On one side of these slots there are plastically deformable vertical plates 5a (shown in FIG. 2a).

A cap 4, or cover, is also associated with the gas generator carrier 3. This cap 4 has two plug elements 9 on each of two opposite-facing walls (only the left one being shown in FIG. 1) whereby these plug elements 9 correspond to and engage in the slots 5 of the gas generator carrier 3. Each plug element 9 has a lip 9a.

On two side walls 10 of the cap which lie at right angles to the sides with the plug elements 9, the cap has a bead-like profile 8. Each bead-like profile 8 corresponds to and engages in a profile groove 6 of the generator carrier.

Figure 2A:
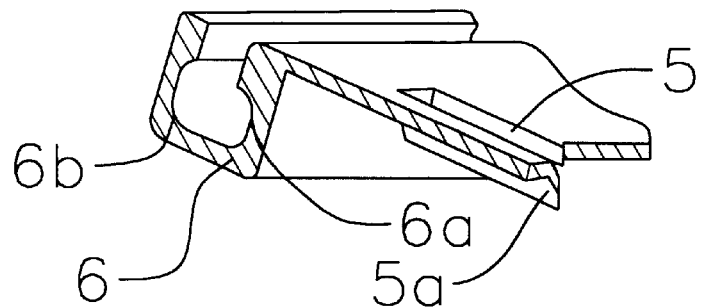
FIGS. 2a to 2c are perspective views of sections of the carrier illustrated in FIG. 1.
Figure 2B:
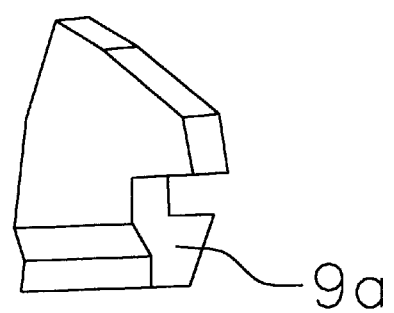
Figure 2C:
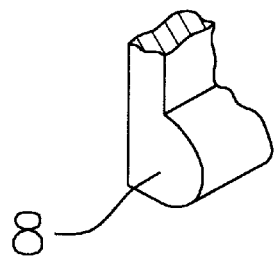

The section of the gas generator carrier 3 illustrated in FIG. 2a shows an enlarged view of the profile groove 6. This profile groove corresponds in cross-section to a flattened "O". This "O" is open at the top in such a way that the profile groove has hollow-profile-type extensions 6a, 6b opposite the open side of the groove. The hollow-profile-type extension 6a corresponds to the bead-like profile 8.

For the purpose of fixing the side walls 10 in the profile groove 6, there is a profile strip 7, which in cross-section has a bead-like reinforcement 7a on one side and a flat side 7b on the opposite side. The profile strip 7 can be inserted into profile groove 6 with its flat side 7b adjacent to the flat side of side wall 10 of cap 4 as illustrated in FIG. 3.

The cap 4 is assembled in such a way that once the gas generator 1 and the gas bag 2 are assembled on the gas generator carrier 3, the cap is so positioned that the plug elements 9 lie above the slots 5 and the side walls 10 lie above the profile grooves 6. Through force on the cap 4 and on the gas generator carrier 3, the lips 9a of the plug elements 9 are inserted into the slots 5. The vertical plates 5a are plastically deformed after the insertion of the lips 9a. As the slots with vertical plates 5a that have not been deformed are narrower than the lips 9a, the cap 4 is thereby connected to the gas generator carrier 3.

Due to the force on the cap 4 and on the gas generator carrier 3, the side walls 10 of the cap are stretched outwards until they engage the hollow-profile-type extensions 6a and lie beside these with their bead-like profile 8.

Figure 3:
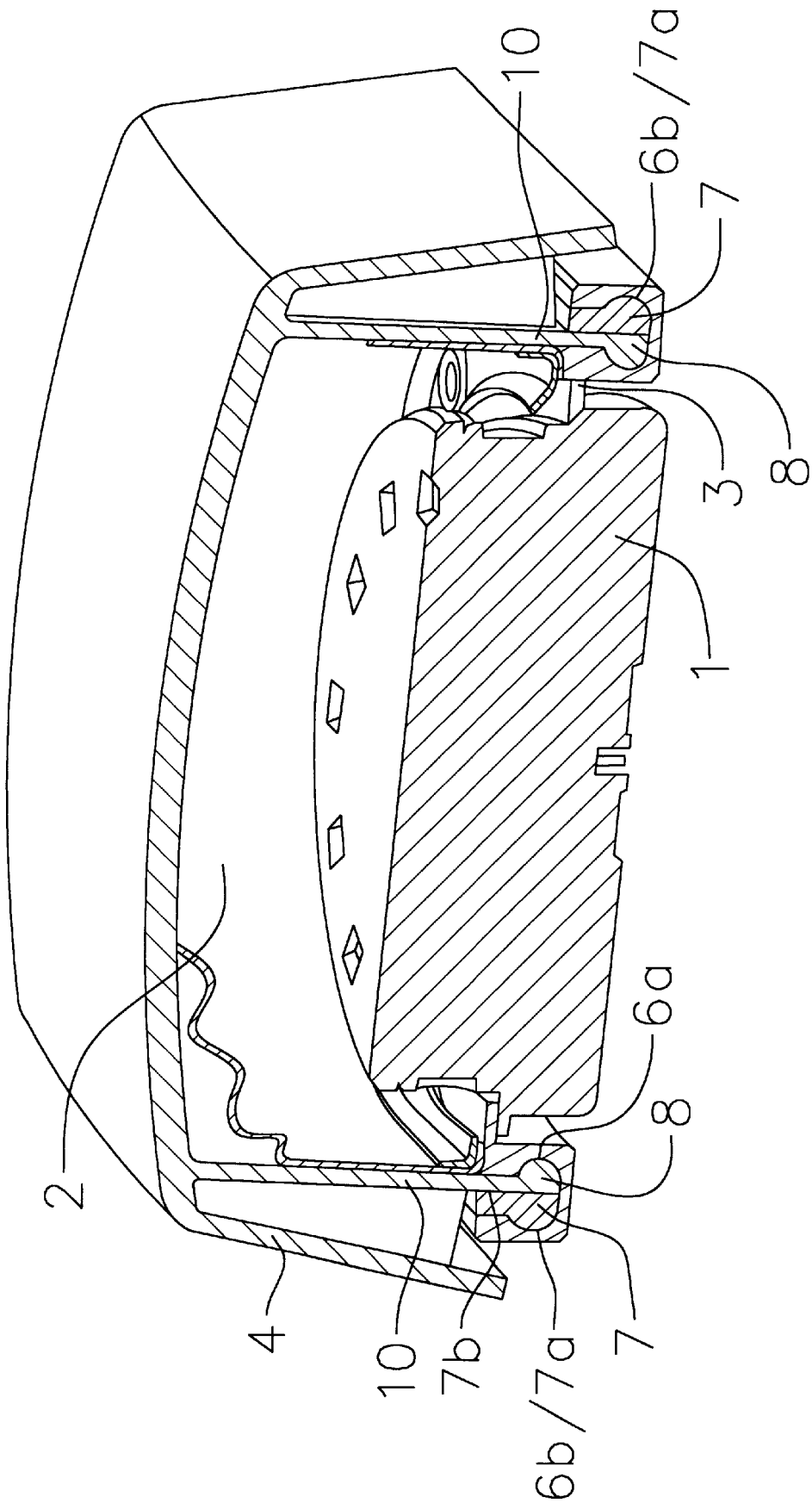
FIG. 3 is a perspective view of a cross-section of the assembled air bag module shown in FIG. 1.

FIG. 3 illustrates a cross-section of an assembled gas bag module in a perspective view. The gas generator 1, the gas bag 2 and the cap 4 are positioned on the gas generator carrier 3. The bead-like profiles 8 of the side walls 10 lie within the hollow-profile-type extensions 6a. Each profile strip 7 lies with its bead-like reinforcement 7a beside the hollow-profile-type extension 6b and with its flat side 7b beside one of the side walls 10. It is thus impossible to lift the cap 4 from the gas generator carrier 3.

Figure 4:
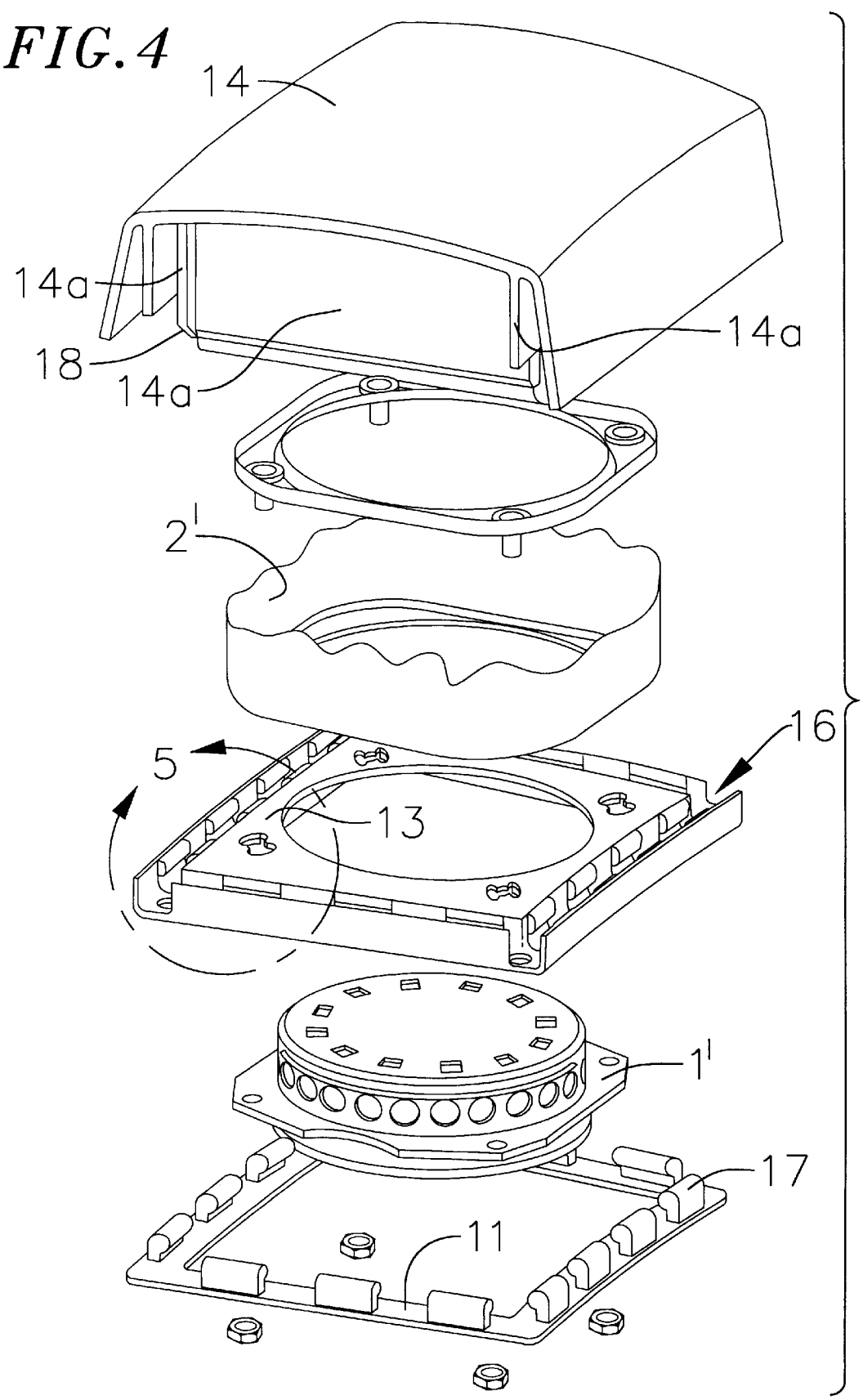
FIG. 4 is an exploded view of another embodiment of the air bag module according to the invention.

Another embodiment of the air bag module according to the invention, which is illustrated in FIG. 4, shows the gas generator 1' and the gas bag 2' (partially shown in a break-away view) illustrated in an exploded view. Both the gas generator 1' and the gas bag 2' are associated with a gas generator carrier 13, which has on each of its four sides a U-shaped profile groove 16.

A cap 14 also corresponds to the gas generator carrier 13. On each of the four side walls 14a of the cap 14, there are bead-like like profiles 18, which correspond to and engage in the profile grooves 16 of the gas generator carrier 13.

Figure 5:
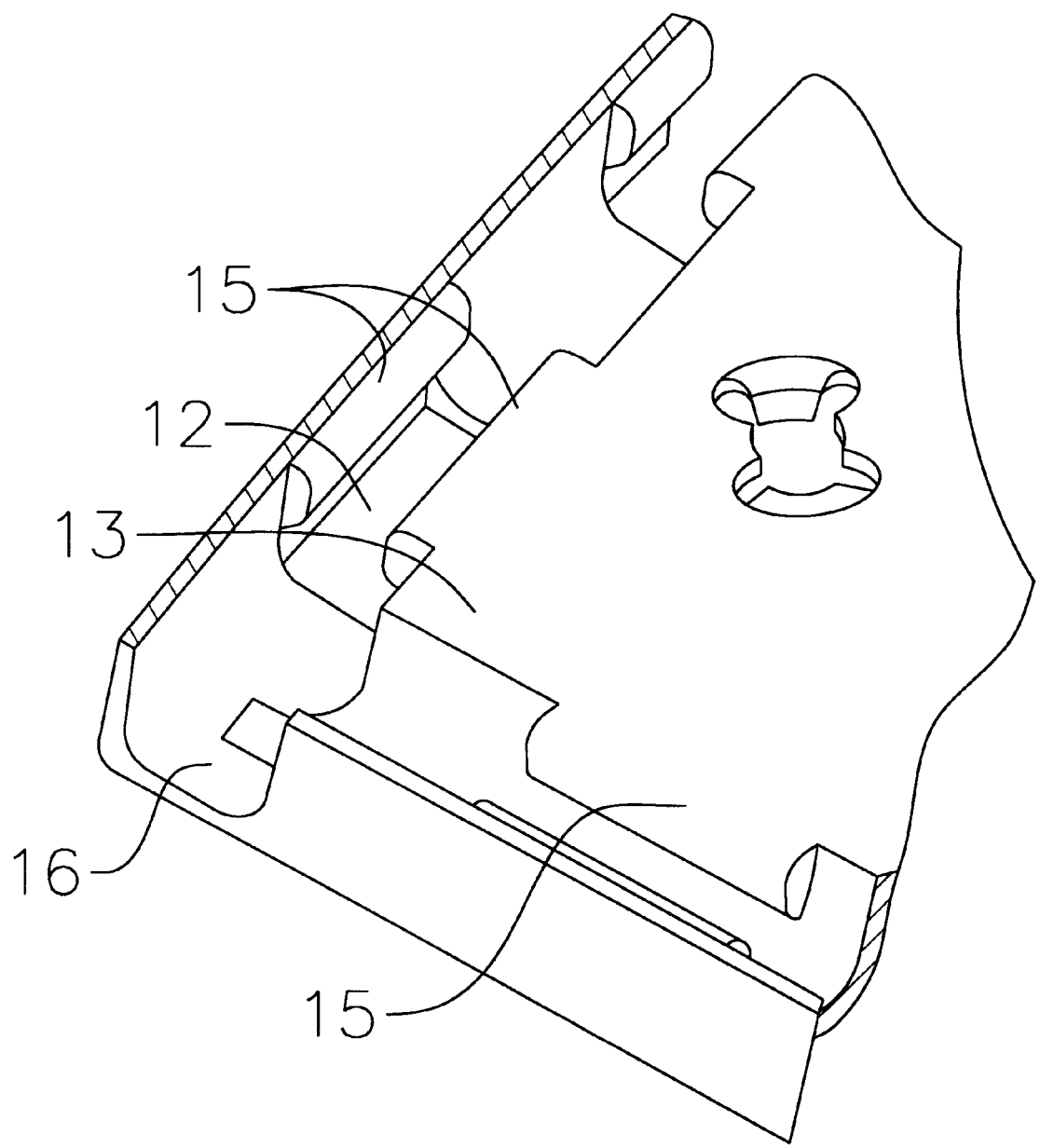
FIG. 5 is a perspective view of a section of the carrier illustrated in FIG. 4 along lines 5—5.

The sectional view of the gas generator carrier 13 illustrated in FIG. 5 shows an enlarged view of the U-shaped profile groove 16. The profile groove 16 has apertures 12 on its underside in the direction of the gas generator 1' as illustrated according to the invention. These apertures are at regular intervals on the profile groove 16. In the region of the apertures 12, the profile grooves 16 have bead-like reinforcements 15, as illustrated in FIG. 5. As a result of these reinforcements, the U-shaped profile groove 16 is made narrower. In these regions, the cross-section thereof is thus similar to the profile groove 6 in the first described embodiment of the invention.

Profile elements 17 are attached to a ring 11 and correspond to and engage in the apertures 12 of the profile groove 16.

Figure 6:
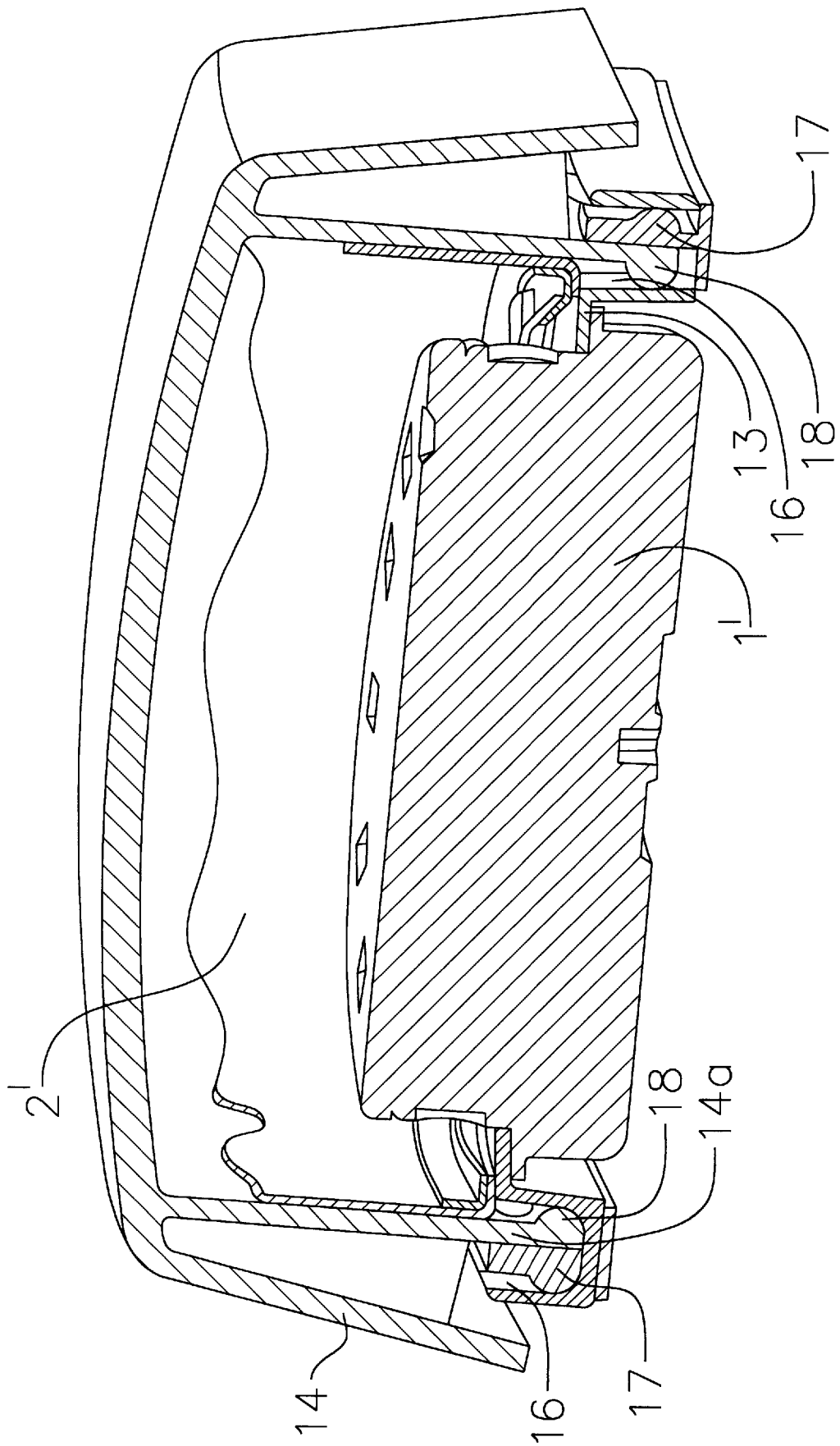
FIG. 6 is a perspective view of a cross-section of another embodiment of the assembled air bag module according to the invention.

FIG. 6 shows the attachment of the cap 14 to the gas generator carrier 13. FIG. 6 shows a cross-section of another embodiment of the assembled gas bag module according to the invention illustrated in a perspective view. The gas generator 1', the gas bag 2' and the cap 14 are positioned on the gas generator carrier 13. The bead-like profiles 18 of the cap 14 are located in the profile groove 16 of the gas generator carrier 13. Also in the profile groove 16 there are the profile elements 17 which are positioned on the ring 11. The ring 11 can be held in its position by different means. This can for example be achieved by adhesion, by insertion of projecting noses (that are not illustrated) in apertures of the generator carrier, or by pressing bungs into holes in the ring.

Figure 7:
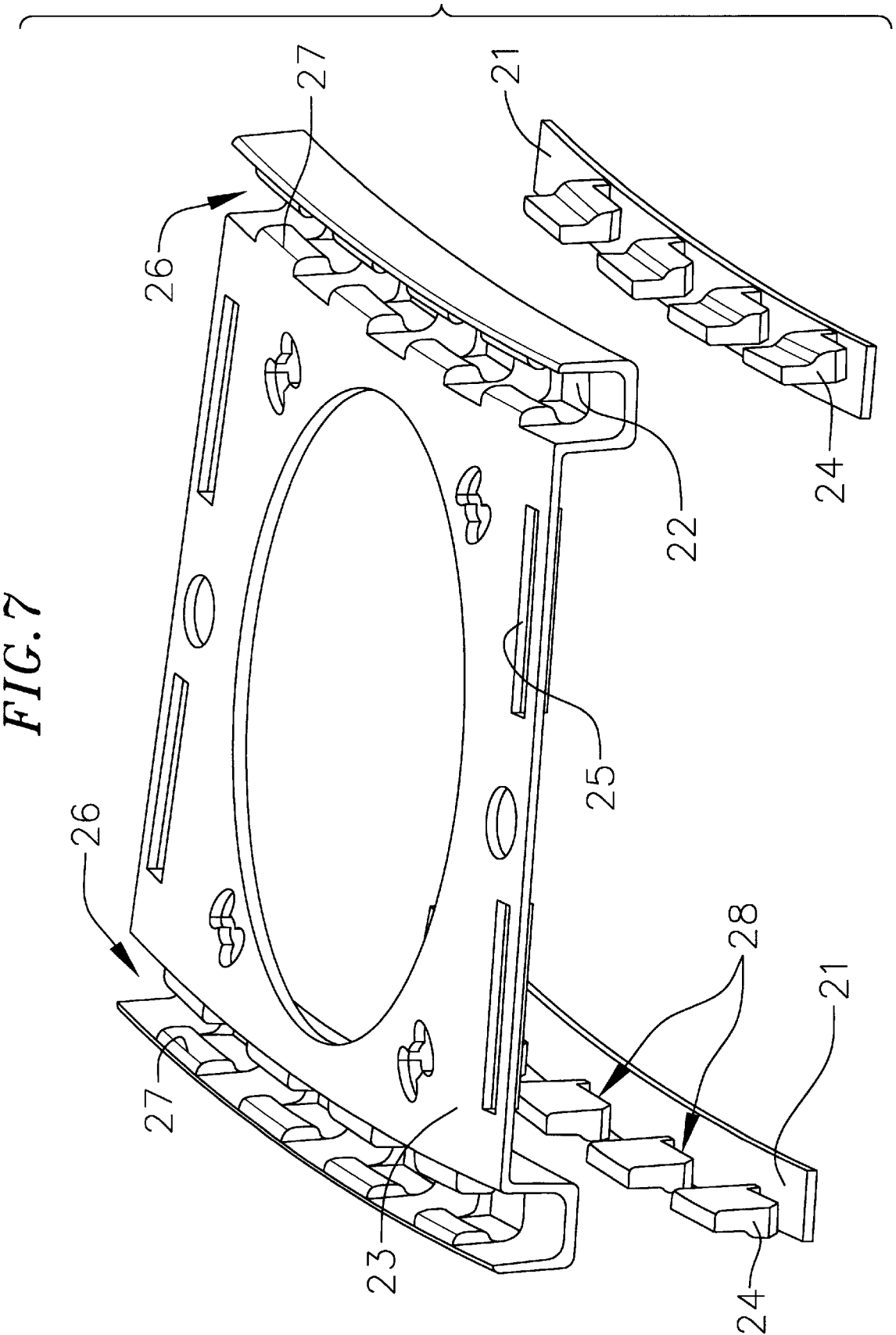
FIG. 7 is a perspective view of a carrier according to yet another embodiment of the gas bag module according to the invention.

FIG. 7 shows a perspective view of a gas generator carrier 23 of yet another embodiment of the air bag module. The gas generator carrier 23 has a profile groove 26 with apertures 22 on two opposite-facing sides. In the region of the apertures 22, the profile groove 26 has bead-like reinforcements 27. At right angles to the sides with profile grooves 26, there are slots 25 on each of the two sides. Both the connection of the cap (not illustrated) and the layout of the other components of the gas bag module are comparable to the above-mentioned embodiments of the invention. Plug elements of the cap correspond to the slots 25. Profiles of the cap correspond to the profile grooves 26.

The difference with regard to the embodiment of FIG. 4 to that of FIG. 7 consists in the securing of the connection between the cover and the gas generator carrier 23. In the embodiment shown in FIG. 7, the components are secured by means of security strips 21 which have profile elements 24. The bases of profile elements 24 are attached to the security strip 21 at one end and in the remaining area they are spaced apart from the security strip 21 to form a gap 28. This gap is at least as wide as the thickness of the base of the profile groove 26.

In order to secure the cap to the gas generator carrier 23, the profile elements 24 are inserted into the profile grooves 26 through the apertures 22. Then the security strips are moved along the profile grooves 26 in the direction of the gaps 28 whereby the base of the profile groove 26 extends in the gaps 28 between the profile elements 24 and the security strip 21.

FIG. 8 shows a perspective view of a further embodiment of a gas generator carrier 33 for an air bag module according to the invention. The gas generator carrier 33 is fitted with a profile groove 36 on two opposite-facing sides, whereby these profile grooves 36 have bead-like reinforcements 34 on their side walls at intervals. At right angles to the sides with the profile grooves 36 there are slots 35 on each of the two sides. The connection of the cap (not illustrated) and the layout of the other components of the gas bag module that are not illustrated is comparable to the preceding embodiments of the invention. Plug elements of the cap correspond to the slots 35. Furthermore, profiles of the cover correspond to profile groove 36. The profiles of the gas generator carrier 33.

From FIGS. 7 and 8, it can be seen that the profile grooves 26, 36 are curved. As a result, the security strip 21 and/or the profile strip 37 are similarly shaped upon insertion and are thus prevented from slipping out to a greater extent.

What is claimed is:

1. An air bag module comprising:
   at least one gas generator;
   a component carrying the gas generator comprising a flat gas generator carrier comprising a plurality of grooves;
   a gas bag;
   an air bag module cover, wherein the cover has means for attachment allowing at least partial structural connection to the component carrying the gas generator, said means for attachment comprising a plurality of profiled sections corresponding to the plurality of grooves in the component carrying the gas generator, and wherein the profiled sections can be inserted and locked in the grooves,
   wherein the cover is a cap which has, on at least two opposite-facing sides, resilient vertical plates with bead shaped profiles, to which the plurality of grooves in the flat gas generator carrier correspond, wherein these grooves have on one side a first hollow profile adapted to the cross-section of the bead shaped profiles and are wider than the adjacent resilient vertical plate; and
   a plurality of profile strips adapted to be inserted into the grooves for locking the vertical plates to the component carrying the gas generator, wherein a corresponding second hollow profile in the grooves is adapted to receive the profile strips.

2. The air bag module according to claim 1, wherein the flat gas generator carrier comprises two U-shaped profile grooves on opposite-facing sides, wherein the two resilient vertical plates of the cap are adapted to grip these profile grooves, and wherein the profile grooves have a plurality of corresponding, spaced-apart bead shaped reinforcements at certain points, and wherein the bead shaped profiles on the vertical plates grip under the bead shaped reinforcements of the profile grooves.

3. The air bag module according to claim 2, wherein the profile strips have on one side continuous bead shaped reinforcements, wherein the profile strips are adapted to be inserted length-wise into the profile grooves, and wherein the shape of the bead shaped reinforcements in the profile grooves correspond to the shape of the profile strips.

4. The air bag module according to claim 2, wherein the profile grooves have a base and apertures disposed in the base, said apertures being in a region where there are bead shaped reinforcements at a plurality of certain points, and wherein a plurality of profile elements fixed to the profile strips can be inserted through each of these apertures at right angles to a run of each groove.

5. The air bag module according to claim 4, wherein the profile elements can be inserted into the profile grooves through the apertures at right angles to the profile grooves, and wherein the profile strips are movable along the profile grooves into an engaged position.

6. The air bag module according to claim 5, wherein a base of each profile element is connected at one end to one of the profile strips and the remainder of the base of each profile element is spaced apart an interval from the profile strips, wherein the interval corresponds at least to the thickness of the base of the profile grooves.

7. The air bag module according to claim 2, wherein the profile grooves of the flat gas generator carrier have, in at least one dimension, a contour which deviates from a straight line.

8. The air bag module according to claim 1, wherein the flat gas generator carrier has at least two narrow sides including the grooves, with apertures in the base of the grooves, wherein the profile strips are formed into a ring, and wherein the profile strips have profile elements positioned on the ring that can be inserted through the apertures.

9. The air bag module according to claim 1, wherein the cap can be locked to the flat gas generator carrier on two opposite-facing sides by means of the profile strips, and wherein on two sides running perpendicularly to these sides, the cap is connected to the generator carrier by means of a plurality of plug fastenings.

10. The air bag module according to claim 9, wherein the plug fastenings comprise a plurality of plug elements with lips provided on the cap, to which a plurality of slots with deformable vertical plates on the gas generator carrier correspond, whereby the lips are wider than the slots prior to inserting the plug elements in the slots.

11. The air bag module according to claim 1, wherein the flat gas generator carrier is a pressure cast or injection molded component.

12. An air bag module comprising:

a flat gas generator carrier comprising a plurality of grooves having, on opposite sides, a first and a second hollow profile;

at least one gas generator connected to the flat gas generator carrier;

a gas bag connected to the at least one gas generator;

a cover comprising, on at least two opposite sides, a resilient vertical plate with bead shaped profiles, each adjacent one of the grooves, having a width less than a width of the adjacent one of the grooves and corresponding in shape to the first hollow profile of the adjacent one of the grooves; and a plurality of profile strips, each adjacent one of the grooves and corresponding in shape to the second hollow profile of the corresponding one of the grooves, and adapted to be inserted in the corresponding one of the grooves with a corresponding one of the bead shaped profiles of the vertical plates, thereby providing a solid connection between the flat gas generator carrier and the cover.

* * * * *